(12) United States Patent
Scharlach

(10) Patent No.: US 12,463,482 B2
(45) Date of Patent: Nov. 4, 2025

(54) METHOD FOR PROVIDING A COMPONENT HAVING A COVER FOR A BODY

(71) Applicant: AUDI AG, Ingolstadt (DE)

(72) Inventor: Albert Scharlach, Oberdolling (DE)

(73) Assignee: AUDI AG, Ingolstadt (DE)

( * ) Notice: Subject to any disclaimer, the term of this patent is extended or adjusted under 35 U.S.C. 154(b) by 245 days.

(21) Appl. No.: 18/316,003

(22) Filed: May 11, 2023

(65) Prior Publication Data

US 2023/0369928 A1 Nov. 16, 2023

(30) Foreign Application Priority Data

May 12, 2022 (DE) .......................... 102022111973.4

(51) Int. Cl.
*H02K 3/12* (2006.01)
*H02K 1/16* (2006.01)
*H02K 15/10* (2006.01)

(52) U.S. Cl.
CPC ............... *H02K 3/12* (2013.01); *H02K 1/165* (2013.01); *H02K 15/105* (2013.01)

(58) Field of Classification Search
CPC ......... H02K 1/165; H02K 3/12; H02K 15/105
USPC ........................................................ 310/208
See application file for complete search history.

(56) References Cited

U.S. PATENT DOCUMENTS

| | | | | |
|---|---|---|---|---|
| 3,495,109 A * | 2/1970 | Ames | ..................... | H02K 3/522 310/260 |
| 4,161,669 A * | 7/1979 | Aimar | ..................... | H02K 3/522 310/260 |
| 4,808,872 A * | 2/1989 | Lund | ..................... | H02K 3/345 310/260 |
| 5,304,885 A * | 4/1994 | Wong | ..................... | H02K 3/345 310/216.115 |
| 5,477,096 A * | 12/1995 | Sakashita | ................. | H02K 1/06 310/216.016 |
| 6,664,703 B2 * | 12/2003 | Oketani | ................. | H02K 3/345 310/216.004 |
| 6,806,614 B2 * | 10/2004 | Kuroyanagi | ............. | H02K 3/34 310/214 |
| 8,558,427 B2 * | 10/2013 | Rhoads | .................... | H02K 3/34 310/214 |
| 10,547,225 B2 * | 1/2020 | Hattori | ................... | H02K 1/185 |
| 2019/0363601 A1 * | 11/2019 | Kneidl | ................. | H02K 15/064 |

(Continued)

FOREIGN PATENT DOCUMENTS

| DE | 102018112347 A1 | 11/2019 |
|---|---|---|
| EP | 3082228 A1 | 10/2016 |
| KR | 20180028767 A | 3/2018 |

*Primary Examiner* — Rashad H Johnson
(74) *Attorney, Agent, or Firm* — Seed Intellectual Property Law Group LLP

(57) ABSTRACT

The disclosure relates to a method of providing a component for an electric machine having a body including multiple grooves and multiple indentations, and a cover including multiple recesses and multiple fixation elements. The method includes arranging at least one of the indentations at an edge of each of the grooves of the body, arranging at least one of the fixation elements at each of the recesses, and arranging the cover on the body with each of the recesses of the cover associated with a respective one of the grooves of the body, and each of the fixation elements of the cover arranged in a respective one of the indentations of the grooves of the body.

10 Claims, 2 Drawing Sheets

(56) References Cited

U.S. PATENT DOCUMENTS

2023/0369928 A1* 11/2023 Scharlach ............. H02K 1/165
2024/0022130 A1*  1/2024 Lettich ................. H02K 3/24

* cited by examiner

METHOD FOR PROVIDING A COMPONENT HAVING A COVER FOR A BODY

BACKGROUND

Technical Field

The disclosure relates to a method for providing a component for an electric machine and to a component for an electric machine.

Description of the Related Art

It is possible to electrically insulate a stator of an electric machine with insulating material on the outside.

A winding of an electric machine is known from publication DE 10 2018 112 347 A1.

Publication KR 20180028767 A describes a method for producing a hairpin coil.

An electric machine with a winding made of rigid rods is known from publication EP 3 082 228 A1.

Against this background, it is desirable to enhance the functionality of an electric machine.

BRIEF SUMMARY

The method of the disclosure is designed for providing, usually for manufacturing and/or assembling, a component for an electric machine, for which a rough body, usually made of metal, comprising multiple grooves, and a cover, made of insulating material for example, comprising multiple recesses, such as openings, are provided. At one edge of each groove of the rough body there is arranged at least one indentation. Moreover, at least one fixation element, usually protruding from the cover, is arranged on each recess of the cover, for example being arranged on it. Furthermore, the cover is arranged on the rough body, and each recess of the cover is matched up with a groove of the rough body. Furthermore, each fixation element of the cover is arranged in a respective indentation of a groove of the rough body. Generally the at least one fixation element at each recess of the cover is arranged in the at least one indentation at the edge of the respective groove.

The cover for the usually metallic rough body serves for the electrical insulation of the rough body from its surroundings. It is possible for the cover to be configured or designated as a template.

In one embodiment of the method, it is proposed that only one indentation configured for example as a step or step-shaped in profile is arranged at the edge at each groove, being introduced and/or molded in or on the complete edge. Furthermore, only one fixation element configured or designated as a collar, a flange, and/or an elevation is arranged at each respective recess, extending along the complete edge of the recess or a corresponding opening.

However, it is also possible for a number of n step-shaped indentations to be arranged on the edge of each groove or introduced into the edge. Accordingly, n fixation elements are likewise arranged on or attached to the respective recess, being configured opposite or complementary to the indentations in profile view. It is possible for each indentation to enclose, for example, a cuboidal region of space, and for each fixation element to be accordingly cuboidal in shape.

In a further embodiment of the method, at least one conductor wire for a winding of the component is arranged, for example inserted, in each groove after the cover has been arranged on the rough body, usually being encased in an insulation. It is possible for such a conductor wire to be configured or designated as a hairpin wire.

The component for an electric machine according to the disclosure is composed of a rough body, usually made of metal, comprising multiple grooves, and a cover, usually made of insulating material, comprising multiple recesses. At one edge of each groove of the rough body there is arranged at least one indentation, usually of step shape. Moreover, at least one fixation element is or can be arranged on each recess of the cover, for example being arranged on it. The cover is or can be arranged on the rough body. Furthermore, each recess of the cover is or can be matched up with a groove of the rough body. Furthermore, each fixation element or the at least one fixation element of the cover is or can be arranged in a respective indentation or the at least one indentation of a groove of the rough body.

Thanks to the proposed configuration of the edge of the respective groove and the at least one fixation element engaging with the at least one indentation, it is possible to provide with the cover an insulation layer for the rough body and thus also for the component being manufactured, the cover being secured at and/or on the rough body to prevent displacements relative to it. Each fixation element is configured opposite to the respective indentation in which it is arranged.

In a further embodiment, the cover is fitted and secured on the rough body by way of the fixation elements at their recesses which are arranged in the indentations of the rough body, the cover being mechanically joined to the rough body. One embodiment of the component proposed here is provided, for example manufactured, with one embodiment of the method proposed here. Usually the component is formed as the stator of the electric machine. However, it is also alternatively conceivable for the component to be formed as the rotor of the electric machine.

The cover of the component is made of plastic, for example, and is additionally braced by the at least one fixation element, for example the collar or a flange, in the at least one indentation of a respective groove. By providing the at least one indentation at the edge of a respective groove, the outer fins of a rough body, formed for example as a laminated core, have a new kind of contour, where each time a fixation element on the cover engages with an indentation on the rough body.

The electric machine with the component can be configured and/or operated as an electric motor and/or as an electric generator, and this electric machine can find use in various technical devices, including also in a vehicle, such as a motor vehicle. Thanks to the configuration of the component, it is possible to prevent a failure of the device comprising the electric machine with the component.

After securing the cover on the rough body, it is possible for the lead wires to become twisted at a designated switching side of the body. Each time a lead wire is introduced into a first side of the groove, laid through it, and led out at a second opposite side or recess. Furthermore, each time two lead wires from neighboring, such as immediately adjacent grooves on one side are twisted together and connected in electrically conducting manner. The lead wires are braced on the cover, such as a template, placed on the rough body, which prevents an insulated lead wire from being bent directly over the usually sharp-edged rough body. The component proposed here has a protection against insulation damage thanks to the interacting and intermeshing indentations and fixation elements, which mechanically secure the cover on the rough body.

Of course, the above mentioned features and those yet to be explained below can be used not only in the particular indicated combination, but also in other combinations or standing alone, without leaving the scope of the present disclosure.

BRIEF DESCRIPTION OF THE SEVERAL VIEWS OF THE DRAWINGS

The disclosure is represented schematically with the aid of embodiments in the drawings and shall be described schematically and at length, making reference to the drawings.

DETAILED DESCRIPTION

The figures shall be described taken together. The same reference numbers are matched up with the same parts.

Figure 1A:
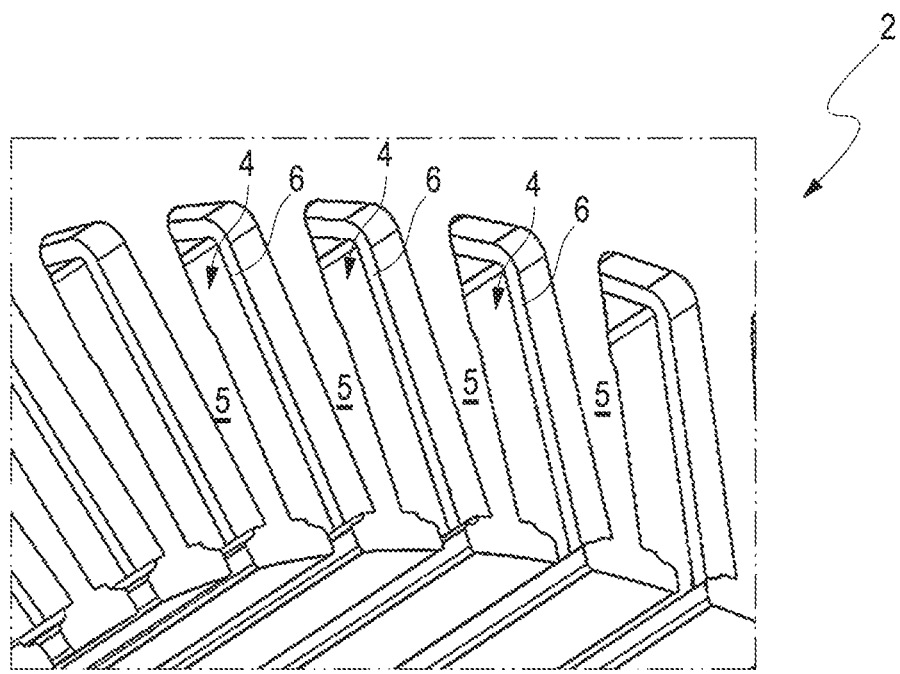
FIGS. 1a, 1b show an example of a rough body and a cover, from which one embodiment of the component according to the disclosure is manufactured by implementing one embodiment of the method according to the disclosure.
Figure 1B:
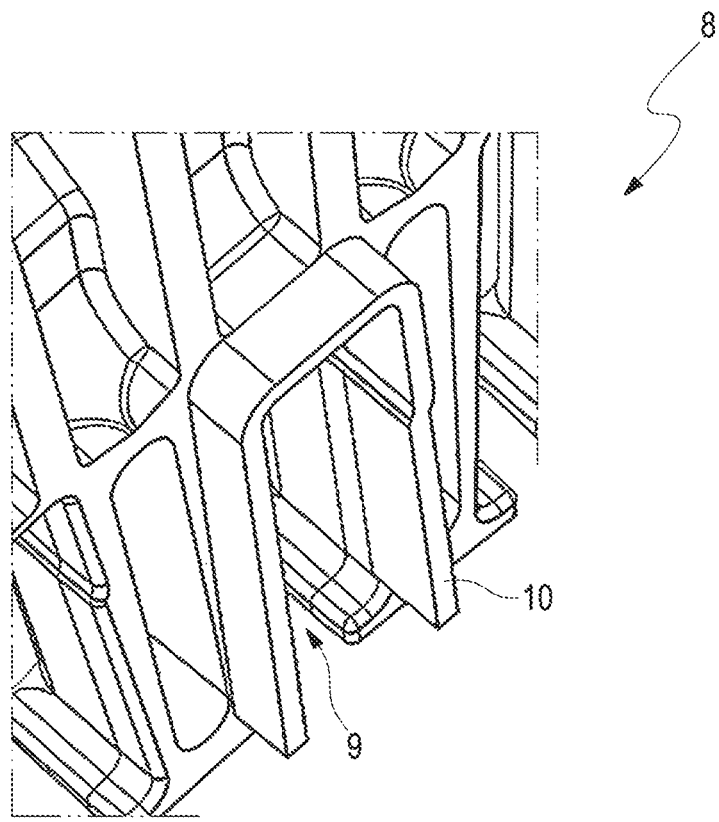
Figure 2:
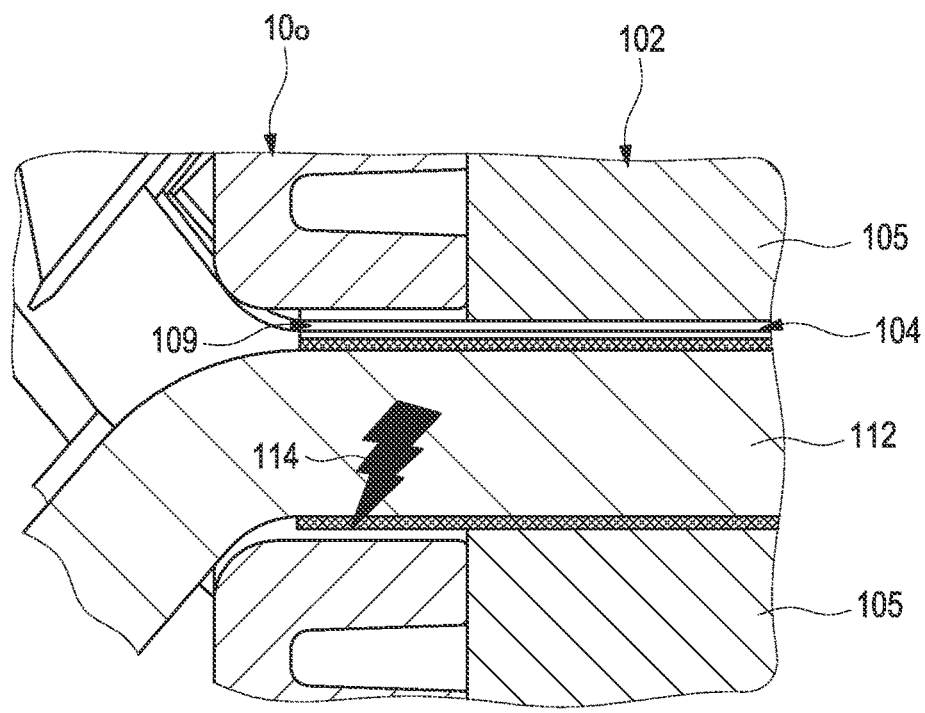
FIGS. 2a, 2b show a detail of the embodiment of the component according to the disclosure and a known component of the prior art in a schematic representation.
Figure 2:
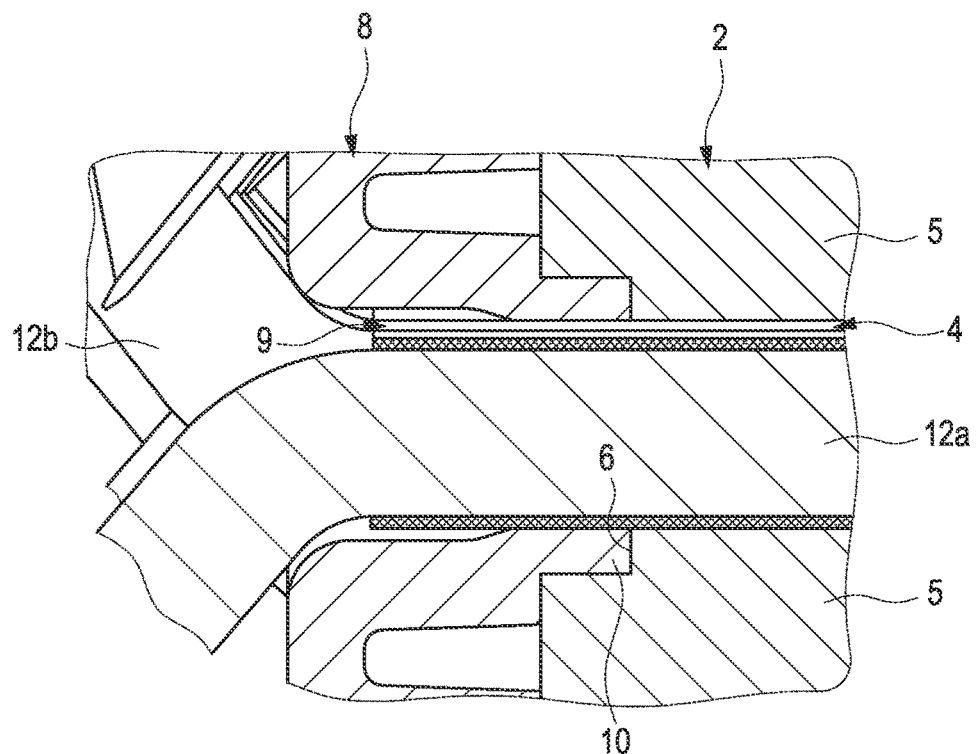

FIG. 1a shows in schematic representation a metallic rough body 2 and FIG. 1b shows a cover 8 made of an insulating material or a corresponding template for the rough body 2, where the rough body 2 and the cover 8 by implementing the method according to the disclosure can be used to manufacture the embodiment of the component according to the disclosure, here, a rotor or alternatively a stator for an electric machine, this component being shown schematically in FIG. 2b.

It is proposed that the rough body 2 is rotationally symmetrical and encloses an axis. The rough body 2 comprises multiple teeth 5, i.e., stator teeth or rotor teeth. Between every two of such teeth 5 there is an axially oriented groove 4. An indentation 6 shaped as a step in profile view or designated as a step is arranged at the edge of each groove 4, having two longitudinal sections oriented relative to each other at an obtuse angle, in one embodiment being mostly parallel to each other. Furthermore, the indentation 6 has a transverse section, joining the two longitudinal sections, each longitudinal section being oriented relative to the transverse section at an acute angle, for the most part an angle not more than 90°. Thus, it is possible for the indentation 6 to also be formed U-shaped or designated as U-shaped.

The cover 8 from FIG. 1b has multiple recesses 9 or openings. At one edge of each such recess 9 there is arranged a fixation element 10, which is formed or designated as an elevation, likewise having two longitudinal sections oriented relative to each other at an obtuse angle, being for the most part parallel to each other in one embodiment. The fixation element 10 also has a transverse section, joining the two longitudinal sections, each longitudinal section being oriented relative to the transverse section at an acute angle, for the most part an angle not more than 90°. Thus, it is possible for the fixation element 10 to also be formed U-shaped or designated as U-shaped.

In the embodiment of the method according to the disclosure, the cover 8 with the fixation elements 10 is mounted at the front on the rough body 2, each recess 9 being matched up with a groove 4. Furthermore, each fixation element 10 at the edge of a recess 9 is arranged in an indentation 6, usually of complementary shape, at the edge of a respective groove 4, being inserted and/or introduced into it. Each longitudinal section of the fixation element 10 engages with a longitudinal section of the indentation 6 and the transverse section of the fixation element 10 engages with the transverse section of the indentation 6.

In this way, the component shown schematically with the aid of FIG. 2b is produced. FIG. 2b also shows two conductor wires 12a, 12b, which are arranged in the groove 4 parallel to the axis of the rough body 2, for example being laid in it, each conductor wire 12a, 12b being enclosed in an insulation. The conductor wires 12a, 12b are braced against the cover 8. Each conductor wire 12a, 12b is connected to a second conductor wire 12b, 12a, running through a further adjacent and parallel groove 4, on a bending side of the component, so that the conductor wires 12a, 12b joined together form a winding for the component.

Furthermore, reference is made to the component known from the prior art and shown schematically in FIG. 2a, likewise having multiple teeth 105, and having a groove 104 arranged between every two teeth 105. FIG. 2a also shows a cover 108 made of insulating material with multiple recesses 109. However, it is provided in the prior art that this cover 108 is merely placed on the rough body 102 and thus can shift relative to the rough body 102, for example during the operation of the component. Furthermore, FIG. 2a also shows a conductor wire 112 provided with insulation, which is arranged in the groove 104. In FIG. 2a, it is indicated by a lightning bolt 114 that the conductor wire 112 has been bent, so that its insulation may be damaged.

German patent application no. 102022111973.4, filed May 12, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of providing a component for an electric machine having a body including multiple grooves and multiple indentations, and a cover including multiple recesses and multiple fixation elements, the method comprising:
    arranging a respective one of the indentations at an edge of each of the grooves of the body, wherein the respective one of the indentations includes a transverse section joining two longitudinal sections, and wherein the transverse section and the two longitudinal sections extend along a complete edge of each of the grooves;
    arranging at least one of the fixation elements at each of the recesses of the cover; and
    arranging the cover on the body with each of the recesses of the cover associated with a respective one of the grooves of the body, and each of the fixation elements of the cover in the respective one of the indentations along the complete edge of the grooves of the body.

2. The method according to claim 1, wherein the respective one of the indentations is formed at the edge of each of the grooves, one of the fixation elements is arranged at each of the recesses, and each of the fixation elements is configured as an elevation.

3. The method according to claim 1, further comprising:
    arranging at least one conductor wire for a winding of the component in each of the grooves.

4. The method according to claim 1, wherein the body includes a plurality of teeth, wherein each of the grooves is disposed between a respective adjacent pair of the plurality of teeth, and wherein, when the component is assembled, the plurality of teeth extend radially inward beyond the fixation elements.

5. The method according to claim 1, wherein the body includes a plurality of teeth, wherein each of the grooves is disposed between a respective adjacent pair of the plurality of teeth, and wherein, when the component is assembled, the fixation elements are offset radially outward from radially inward ends of the plurality of teeth.

6. A component for an electric machine, comprising:
a body including multiple grooves and multiple indentations; and
a cover including multiple recesses and multiple fixation elements,
wherein a respective one of the indentations is arranged at an edge of each of the grooves of the body,
wherein the respective one of the indentations includes a transverse section joining two longitudinal sections,
wherein the transverse section and the two longitudinal sections extend along a complete edge of each of the grooves,
wherein at least one of the fixation elements is arranged at each of the recesses of the cover, and
wherein the cover is arranged on the body with each of the recesses of the cover associated with a respective one of the grooves of the body, and each of the fixation elements of the cover is arranged in the respective one of the indentations along the complete edge of the grooves of the body.

7. The component according to claim 6, wherein the cover is secured on the body by the fixation elements at the recesses arranged in the indentations of the body.

8. The component according to claim 6, wherein the component is configured as a stator of the electric machine.

9. The component according to claim 6, wherein the body includes a plurality of teeth, wherein each of the grooves is disposed between a respective adjacent pair of the plurality of teeth, and wherein, when the component is assembled, the plurality of teeth extend radially inward beyond the fixation elements.

10. The component according to claim 6, wherein the body includes a plurality of teeth, wherein each of the grooves is disposed between a respective adjacent pair of the plurality of teeth, and wherein, when the component is assembled, the fixation elements are offset radially outward from radially inward ends of the plurality of teeth.

* * * * *